Patented June 14, 1938

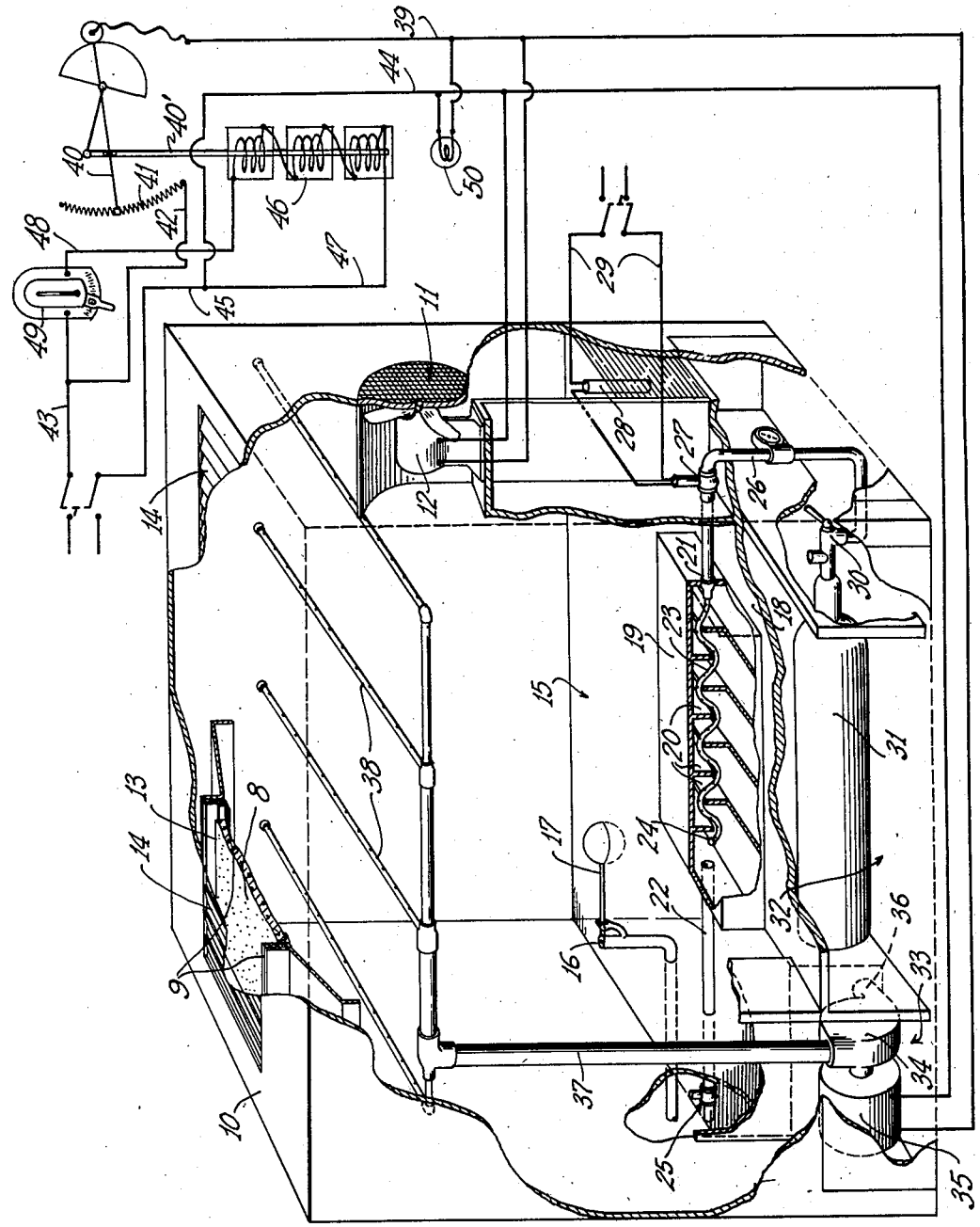

2,120,299

UNITED STATES PATENT OFFICE 2,120,299

COOLING APPARATUS

Nicola Stramaglia, Chicago, Ill.

Application August 24, 1937, Serial No. 160,616

6 Claims. (Cl. 62—134)

This invention relates to refrigerating and cooling apparatus, and more particularly to an improved form of air conditioning unit.

One of the objects of the invention is the provision of a simplified cooling unit of the semi-portable class and one which is relatively inexpensive to manufacture and operate.

A further object is the provision of an air conditioning apparatus adapted to cool air by circulating the air through a stream of water cooled by means of the expansion of a liquefied gas from a portable container into an expansion chamber disposed within a body of water from which a spray is established by pump means.

A further object is the provision of a non-cyclic cooling unit adapted to employ a replaceable cartridge of compressed refrigerant to provide a semi-portable unit especially suited to discontinuous use.

A further object is the provision of a cooling unit including a housing and fan means for circulating air through the housing, the lower portion of the housing providing a tank in which is normally retained a quantity of water, a refrigerant expansion chamber arranged in the body of water, and water cooling means in the form of a portable tank of liquefied gas connected with the expansion chamber and adapted to be replaced by a similar tank when the supply of refrigerant is exhausted, the tanks of liquefied gas being of a type commonly available in the market, and means including a motor driven pump for distributing water from said supply in the housing in a spray against the air circulated through the housing.

A further object is the provision of a simple air conditioning unit which dispenses with complicated refrigerating mechanism for the repeated compression and expansion of a refrigerant gas, and replaces such mechanism by a simple arrangement of an expansion tank in a body of cooling water and means for connecting commercially available tanks of liquefied gas to the expansion chamber, the tanks being replaced as needed.

Still another object is the provision in a cooling unit of the type characterized of a simple temperature control arrangement for maintaining a desired temperature, both in the cooling water and in a chamber to be supplied with cooled air.

Other objects and novel aspects of the invention will appear as the following description proceeds in view of the single figure of the drawing wherein is illustrated one particular embodiment of the invention.

A preferred form of the cooling apparatus includes an upstanding housing 10 having an air intake 11 in one side wall thereof, means in the form of a motor driven blower 12 arranged interiorly of the housing to draw air in through the opening 11, and an exhaust opening 13 in the top of the housing, this latter opening being provided with a plurality of baffles 14.

The bottom region of the housing 10 provides a tank into which a quantity of water 15 is introduced by means of a supply line 16 preferably controlled by a float valve 17. Disposed on the bottom 18 of the housing is an expansion tank 19 of substantially flat form and provided on its interior with a plurality of laterally parallel baffles 20 alternately spaced from opposite side walls of the chamber so as to provide a staggered path from the intake connection 21 to the exhaust connection 22 thereof.

Connected with the intake connection or union 21 is an expansion pipe 23 having a plurality of bends and weaving its way toward the exhaust connection 22, this pipe 23 being provided throughout its length with a plurality of small expansion ports through which the refrigerating liquid can escape into the various compartments in the expansion chamber, it being observed that the remote end 24 of the expansion pipe is closed, and the gas within the chamber escapes therefrom through the exhaust connection 22 and an adjustable needle valve 25 disposed exteriorly of the housing.

Connected to the gas intake union 21 is a refrigerant feed line 26 in which is an electrically controlled expansion valve 27 operatively controlled by a thermostatic element 28 arranged within the body of water 15 for operative response to the temperature of the latter, the valve 27 and thermostatic control 28 being included in a power circuit 29 from which energy is derived to operate the expansion valve 27 responsive to changes in temperature in the body of water 15. At its opposite end the feed line 26 is connected to a valved tank union 30 suited for ready connection to a supply tank 31 containing a quantity of liquefied gas, such as carbon dioxide or carbonic acid gas, and preferably of a type commonly available on the market. This tank 31 is conveniently housed in a compartment 32 provided under the floor 18 in the housing. The valved union 30 is conveniently accessible for the purpose of changing tanks.

Disposed in a corner compartment 33 of the housing is a circulating pump 34 driven by a motor 35 and having an intake connection 36 communicating with the body of water 15, and an output line 37 connected with an overhead spray pipe system 38 for maintaining a continuous spray across the path of air moving into the air intake opening 11 out through the baffled exhaust opening 13.

Both the pump motor 35 and the blower 12 are connected in a power circuit including a conductor 39 connected to a movable contact arm 40 variably engageable with a series resistance 41 connected by conductor 42 to one side 43 of a power source, the return circuit being effected through a conductor 44 connected with the other side 45 of this power source.

In order to vary the speed of operation of the motor 35 and blower 12, the sliding contact arm 40 in the temperature control unit is adapted to be moved back and forth by an armature 40' moved in opposite directions by electromagnetic means in the form of solenoids 46 connected by a conductor 47 to one side 45 of the power source and by a conductor 48 through an adjustable thermostatic switch 49 to the opposite side 43 of the power source, the armature 40' having a normal position from which it is moved by the means 46 proportionately to the current flow under control of the thermostat 49 so that more or less of the series resistance 41 is cut into and out of the motor and blower circuit. 50 indicates a pilot lamp in the motor circuit.

In operation the movable resistance arm 40 will be normally positioned to open the circuit 39—44, and when the thermostat 49 is operated responsive to a given temperature change, the electromagnetic means 46 will cause the arm 40 to assume a particular position in contact with the resistance 41, and motor 35 and blower 12 will be driven at a corresponding speed and will effect the spraying of water through the pipe system 38 and a movement of air from the intake through the spray and out the top opening 13 in the housing, there being an exchange of heat between the spray and incoming air. The body of water 15 is adapted to be maintained at a given temperature under the control of a thermostatic switch 28 in the body of water and effective to operate the electromagnetic expansion valve 27 to admit a quantity of liquid gas from the tank 31 through the feed line 26 into the expansion pipe 23 in chamber 19 which will be cooled as a result of the gasifying of the liquid and hence cool the body of water 15 until the desired temperature is reached, whereupon the thermostat 28 will shut off the flow of liquid from the tank or reservoir. The gas in chamber 19, having dropped considerably in temperature, will expand through the exhaust line 22 and valve 25, and by adjustment of the valve 25 the expansion may be made to occur in stages, first from the tank 31 into the expansion chamber and then from the expansion chamber through the valve 25 so as to effect a thorough heat exchange between the gas and expansion chamber and in turn the water 15.

It will be understood that the foregoing unit may be constructed on a small scale for purposes of portability, the tanks 31 being available on the market in varying sizes suitable for such an arrangement, and by omitting previously employed and complicated refrigerating mechanism, the initial cost of the unit is greatly lowered; and in addition to the advantage of portability there is the further advantage, particularly in larger installations, of an inexpensive cooling system for intermittent use or for use during relatively short periods of time when the expense of the so-called continuous cycle type of machine now commonly in use, would not be justified.

It may be observed that for purposes of portability or temporary installation, it is not necessary to connect the water supply line to the housing tank since the quantity of water therein will last a relatively long time without the necessity of replenishment. The only connection necessary under these circumstances is that to a source of power to drive a pump and blower and the provision of a simple exhaust lead from the gas exhaust valve 25 to a window or the like.

In order to remove a portion of the excess moisture carried by the washed or outgoing air, I provide a desiccator in the form of an air permeable sponge mat 8 supported on marginal flanges 9 around the top opening 13. When the sponge becomes saturated, excess moisture tends to gravitate back into the tank.

Various modifications may be made in the specifically detailed illustration set forth herein, and it is to be understood that all changes in form and location of the arrangement of parts herein described are intended to be included within the call of the appended claims.

Having thus described my invention, what I claim as new and desire to protect by Letters Patent is:

1. A cooling unit comprising a housing providing a tank in its lower region, electrically operated means for circulating air through said housing, a quantity of water disposed in the tank portion of the housing, electrically driven circulating means for spraying said water across the path of movement of air in the housing, and means for cooling said water and including an expansion chamber disposed within the body of water, said chamber having an exhaust line communicating exteriorly of the housing, a perforate expansion pipe within the chamber, a tank of liquid refrigerant under pressure removably supported in said housing, and duct means including an electrically operated expansion valve connecting said tank and said expansion pipe, thermostatic switch means operable by temperature changes in said water for operating said expansion valve, and thermostatic control means operably responsive to temperature changes in the air being cooled for controlling said pump means and said air circulating means.

2. A semi-portable cooling system comprising a housing providing a tank for water, driven means for circulating air through said housing, driven means for spraying water from said tank through said air, an expansion tank disposed within the body of water in said water tank and having an exhaust duct leading therefrom, expansion means within said expansion tank, and conduit means for removably connecting said expansion means with a portable tank of compressed refrigerant, together with thermostatic valve means controlled by the temperature of said body of water for regulating the escape of refrigerant into said expansion means.

3. A non-cyclic type of cooling unit including a housing providing a water tank, means for maintaining a circulatory spray of water in said tank, blower means for forcing air through said spray, an expansion chamber in said water tank and having a waste gas exhaust, a replaceable refrigerant cartridge mounted in said housing and duct means for delivering refrigerant from said cartridge to said expansion chamber, and means controlled by the temperature of water in said tank for regulating said delivery of refrigerant, together with an adjustable expansion valve for said waste gas exhaust.

4. A non-cyclic semi-portable type of cooling unit including a housing providing a water tank with a compartment therebelow, blower means for circulating air through said housing, driven means for spraying water from said tank across the path of movement of said air, an expansion chamber within the body of water in said tank and having a waste gas exhaust leading out of said unit, and a plurality of interior ribs on opposite walls of the chamber and alternately spaced from opposite walls to provide heat conductive elements for said chamber, an expansion pipe extending transversely of said ribs in said chamber and closed at one end and having a plurality of small expansion ports throughout its length, a replaceable cartridge of compressed refrigerant liquid mounted in said compartment below the tank and connected through temperature controlled valve means with said expansion pipe, whereby the temperature of said water and the air sprayed thereby may be controlled until the refrigerant supply in said cartridge is exhausted.

5. The device of claim 4 further characterized by the provision of an adjustable expansion valve for said waste gas exhaust.

6. A non-cyclic semi-portable type of cooling unit including a housing providing a water tank with a compartment therebelow, blower means for circulating air through said housing, driven means for spraying water from said tank across the path of movement of said air, an expansion chamber within the body of water in said tank and having a waste gas exhaust leading out of said unit, and a plurality of interior ribs on opposite walls of the chamber and alternately spaced from opposite walls to provide heat conductive elements for said chamber, an expansion pipe extending transversely of said ribs in said chamber and closed at one end and having a plurality of small expansion ports throughout its length, a replaceable cartridge of compressed refrigerant liquid mounted in said compartment below the tank and connected through temperature controlled valve means with said expansion pipe, whereby the temperature of said water and the air sprayed thereby may be controlled until the refrigerant supply in said cartridge is exhausted, together with an expansion valve for said waste gas exhaust, and air-permeable sponge means interposed in said housing in the path of the air passing out of the same.

NICOLA STRAMAGLIA.